United States Patent [19]

Lowe

[11] Patent Number: 5,019,602

[45] Date of Patent: May 28, 1991

[54] POLYURETHANE FOAMS, COMPOSITIONS TO PREPARE SAME AND PROCESS TO PREPARE SAME

[75] Inventor: Frank J. Lowe, Euclid, Ohio

[73] Assignee: Premier Industrial Corporation, Cleveland, Ohio

[21] Appl. No.: 449,572

[22] Filed: Dec. 12, 1989

[51] Int. Cl.$^5$ ............................................. C08G 18/14
[52] U.S. Cl. ................................... 521/127; 521/114; 521/129; 521/156
[58] Field of Search ................ 521/127, 129, 114, 156

[56] References Cited

U.S. PATENT DOCUMENTS

| | | | |
|---|---|---|---|
| 3,184,420 | 5/1965 | Brack | 260/2.5 |
| 3,281,379 | 10/1966 | Fontaine et al. | 260/2.5 |
| 3,519,708 | 7/1970 | McMichael | 264/321 |
| 3,539,648 | 11/1970 | Orkin | 260/615 |
| 3,781,229 | 12/1973 | Smith et al. | 260/2.5 |
| 3,883,619 | 5/1975 | Jenkner | 260/952 |
| 4,258,137 | 3/1981 | Cogliano | 521/55 |
| 4,518,720 | 5/1985 | Cuscurida et al. | 521/156 |
| 4,568,705 | 2/1986 | Grace et al. | 521/137 |
| 4,647,624 | 3/1987 | Stamberger | 525/187 |
| 4,789,690 | 12/1988 | Milovanovic-Lerik et al. | 521/137 |

*Primary Examiner*—Maurice J. Welsh
*Attorney, Agent, or Firm*—Jones, Day, Reavis & Pogue

[57] ABSTRACT

Polyurethane foams, varying in nature from soft to hard, tough skin and a process for their preparation comprising reacting approximately equal volumes of substantially liquid mixtures from a two part dispensing system, Part A comprising a substantially liquid, stable mixture of an isocyanate and an epoxide and Part B comprising a substantially liquid mixture of a polyether polyol, a catalyst and an accelerator.

17 Claims, No Drawings

POLYURETHANE FOAMS, COMPOSITIONS TO PREPARE SAME AND PROCESS TO PREPARE SAME

BACKGROUND OF THE INVENTION

1. Field of the Invention

This invention concerns polyurethane foams, compositions to prepare same, and a process for the preparation of same. Specifically, the invention relates to improved polyurethane foams, having a tough skin, varying in nature from soft to hard, prepared by reacting approximately equal volumes of a mixture of a substantially liquid mixture of an isocyanate and an epoxide supplied from one part of a two part dispensing system with a substantially liquid mixture of a polyether polyol, a catalyst and an accelerator supplied from a second part of a two part dispensing system. The invention also relates to using certain, selected epoxides to impart stability to the mixture of the isocyanate and the epoxide.

2. Description of the Prior Art

Heretofore, it has not been known to prepare polyurethane foams with certain properties from one mixture of an isocyanate and an epoxide and a second mixture of polyether polyol, catalyst and accelerator.

It is known in the art to prepare polyurethanes from a polyol, an isocyanate, a catalyst and an accelerator. It is also known to use epoxides together with polyols, isocyanates, acatalyst and an accelerator to yield polyurethane foams. For example, the patent to Milovanovic-Lerik et al., U.S. Pat. No. 4,789,690, teaches a polyurethane made by first reacting an epoxy resin and an epoxy hardener in the presence of a polyol, and then reacting the resulting polymer polyol dispersion with an isocyanate. The patent to Cuscurida et al., U.S. Pat. No. 4,518,720, discloses a two-step reaction, whereby a polyurethane is formed by adding an epoxy resin-diamine adduct to a polyether polyol, and then reacting such modified polyol with a polyisocyanate. The patent to Brack et al., U.S. Pat. No. 3,184,420, discloses a polyurethane foam made by reacting a polyol containing at least 10% of a linear polymeric ester (prepared by heating either an epoxidized aliphatic acid or a halohydrated saturated aliphatic acid) with a polyisocyanate. The patent to Fontaine et al., U.S. Pat. No. 3,281,379, teaches a process for making a polyurethane foam by reacting a polyol with a polyisocyanate in the presence of a volatile chlorinated lower alkane and an epoxy compound.

Although each of these patents utilizes an epoxide to impart certain characteristics to a polyurethane foam, none of them concerns the specific pre-mixed components described herein having shelf life stability to yield a foam with the improved properties as imparted by the compositions of the instant disclosure. The unique arrangement of components and unique method of reacting the components as disclosed herein yields a polyurethane foam with a tough skin. This improved property is achieved whether the resulting foam is hard or soft.

Further, no known available method to make polyurethanes allows all the reactive components to be packaged in a two part dispensing system, thereby allowing the user to store the components in such a form that can be readily accessed and dispensed at the time when and location where desired for the product polyurethane foam. The foams and methods available in the art described above could not be prepared or accomplished using a two part dispensing system contemplated herein, because (1) the U.S. Pat. No. 4,789,690 and U.S. Pat. No. 4,518,720 each purport to describe the epoxide being first reacted with the polyol and this polyol/epoxide product being then reacted with an isocyanate, and the polyol/epoxide product is believed to be too viscous to be dispensed from the dispensing system contemplated; and (2) the U.S. Pat. No. 3,184,420 and U.S. Pat. No. 3,281,379 each purport to describe a reaction that is accomplished by reacting all the components at once and therefore does not lend itself to use in a two part dispensing system.

By supplying an epoxide and an isocyanate from one part of a two part dispensing system and polyether polyol, catalyst and accelerator from a second part, this invention avoids the viscosity problem that would arise if either the U.S. Pat. No. 4,789,690 or U.S. Pat. No. 4,518,720 method were used, it is believed. The solution to the viscosity problem, however, gives rise to a new problem: once epoxides and isocyanates are mixed, they frequently became unstable as a result of residual hydroxyls present in epoxides that react with the isocyanate, causing premature gelation and shelf life instability. By using selected epoxides, however, this composition disclosed herein solves the problem of shelf life instability.

Accordingly, it is one object of the present invention to provide compositions for the preparation of polyurethane foams, which compositions are nonviscous, are easily dispensed from a two part dispensing system, and have a long shelf life.

It is yet another object of the present invention to provide a method for the preparation of polyurethane foams whereby the components have a long shelf life and can be stored in a two part dispensing system until ready for use.

It is still another object to impart shelf life stability to an isocyanate and epoxide mixture.

It is yet a further object of this invention to provide an improved polyurethane foam with a tough skin.

As described herein, as one skilled in the art would recognize, these and other objects may be accomplished by utilizing the compositions, methods and products more fully described herein.

SUMMARY OF THE INVENTION

A polyurethane foam produced by a process comprising mixing approximately equal volumes of a first substantially liquid mixture having shelf life stability comprising an isocyanate and an epoxide with a second substantially liquid mixture comprising a polyether polyol, a catalyst and an accelerator.

DETAILED DESCRIPTION OF THE INVENTION

In part A of a two part dispensing system is placed a certain volume of an isocyanate and an epoxide; in part B of a two part dispensing system is placed approximately the same volume of a polyether polyol, a catalyst and an accelerator. The two parts are mixed and dispensed at the time when and location where the polyurethane foam is desired. As used herein, "part A" and the "first substantially liquid mixture" are interchangeable terms; "part B" and the "second substantially liquid mixture" are also interchangeable terms.

A wide variety of isocyanates are useful in practicing this invention, depending upon the properties desired in the resultant foam. Isocyanates well known in the art may be used, and include aliphatic, cycloaliphatic, aromatic, aromatic-aliphatic and heterocyclic polyisocyanates, as for example described in Justus Liebig's *Annalen der Chemie*, 562, pages 75 to 136 by W. Siefgen, the disclosure of which is included by reference.

Specific examples of useful isocyanates include, for example and without limitation, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-and 1,4-diisocyanate and any mixtures thereof, 1-isocyanato-3,3,5-trimethyl-5-isocyanato-methylcyclohexane (German Auslegeschrift 12 02 785), 2,4- and 2,6-hexahydrotoluylene diisocyanate as well as any mixtures thereof, hexahydro-1,3 and/or -1,4-phenylenediisocyanate, perhydro-2,4'- and/or -4,4'-diphenylmethanediisocyanate, 1,3-and 1,4-phenylene diisocyanate, 2,4'- and 2,6-toluene diisocyanate and any mixtures thereof, diphenyl-methane-2,4'- and/or -4,4'-diisocyanate, naphthylene-1,5-diisocyanate, triphenyl methane-4,4',4''-triisocyanate, polyphenyl polymethylene polyisocyanates which may be obtained by condensing aniline with formaldehyde, followed by phosgenation as described, for example, in British Pat. No. 874,430 and 848,671, perchlorinated aryl polyisocyanates of the type described in German Ausleschrift No. 1,157,601, polyisocyanates containing carbodiimide groups, of the type described in German Pat. No. 1,092,007, the diisocyanates in U.S. Pat. No. 3,492,330, polyisocyanates containing allophanate groups of the type described for example in British Pat. No. 994,890, Belgian Pat. No. 761,626 and published Dutch Pat. Application No. 7,102,524, polyisocyanates containing isocyanate groups of the type described, for example, in German Pat. Nos. 1,022,789, 1,222,067 and 1,027,394 and in German Offenlegungsschriften Nos. 1,929,034 and 2,004,048, polyisocyanates containing urethane groups as described in U.S. Pat. No. 3,394,164, polyisocyanates containing acylated urea groups such as are described in German Pat. No. 1,230,778, polyisocyanates containing biuret groups of the type described, for example, in German Pat. No. 1,101,394, in British Pat. No. 889,050 and in French Pat. No. 7,017,514, polyisocyanates obtained by telomerization reaction as described in Belgian Pat. No. 723,640, polyisocyanates containing ester groups of the type described, for example, in British Pat. No. 956,474 and 1,072,956, U.S. Pat. No. 3,567,763 and in German Pat. No. 1,232,688, and reaction products of the above mentioned isocyanates with acetals as described in German Pat. No. 1,072,385. Useful polyisocyanates are furthermore those described in U.S. Pat. No. 3,194,773. It is also possible to use mixtures of the aforementioned polyisocyanates.

The isocyanate that is especially preferred for use with the compositions disclosed herein is polymethylene polyphenylisocyanate, commercially available from BASF under the trade name Lupranate M-10. Polyurethane foams obtained from the use of toluene diisocyanate have not yet been found to be operative to the extent desired and normally achieved herein.

Preferably, the amount of isocyanate in the substantially liquid mixture in part A falls in the range of 20 to 90% by weight.

Epoxides that may be used and mixed with the isocyanate in the substantially liquid mixture in part A include, as representative examples, 2-ethylhexyl glycidyl ether and normal alkyl glycidyl ether having alkyl moieties of 12 to 14 carbon atoms. Useful for the invention is normal alkyl glycidyl ether having alkyl moieties of 12 to 14 carbon atoms, commercially available from Pacific Anchor Chemical under the trade name Epodil 748.

The epoxide that is especially preferred for use herein is 2-ethylhexyl glycidyl ether, commercially available from Pacific Anchor Chemical under the trade name Epodil 746.

The following epoxides are effective for preparing polyurethane foams but result in the mixture of isocyanate and epoxide having a shelf life stability of less than two months: 4,4'-isopropylidinediphenol (Bisphenol A), diglycidyl ether of 1,4-butanediol, N,N,N',N'-tetraglycidyl-4,4'-methylenebisbenzeneamine, poly(oxipropylene)glycol, diglycidyl ether of cyclohexane dimethanol, triglycidyl ether of trimethylol ethane and blends of such epoxides.

Preferably, the amount of epoxide utilized and mixed with the isocyanate in the substantially liquid mixture that comprises part A falls in the range of 10 to 60% by weight.

It has been discovered that the problem of shelf life instability of commonly preparable mixtures of an isocyanate and an epoxide can be associated with the number of hydroxyl groups found in the particular epoxide selected. It is believed that hydroxyls react with the isocyanate resulting in undesired gelation or hardening and shelf life instability. Experimentation has revealed that at least three possible variables impact upon the number of hydroxyls in any given epoxide: moisture content, functionality and molecular weight.

First, the manufacturing process for epoxides usually leaves the product with some residual moisture, which amount the manufacturer usually provides on the label of the epoxide. When epoxides with moisture of about 0.2% or greater are used in the process disclosed herein, poor shelf life stability of the mixture of epoxide and isocyanate was obtained. For example, a mixture of polymethylene polyphenylisocyanate and butyl glycidyl ether, commercially available from Hi-Tek Polymers Inc. under the trade name Heloxy WC-61, having a moisture content of about 0.2%, was stable for only 6 days. A mixture of polymethylene polyphenylisocyanate and cresyl glycidyl ether, commercially available from Pacific Anchor Chemical Corporation under the trade name Epodil 742, having a moisture content of about 0.2%, was stable for only twelve days. In contrast, a mixture of polymethylene polyphenylisocyanate and 2-ethylhexyl glycidyl ether, commercially available from Pacific Anchor Chemical under the trade name Epodil 746, having a moisture content of about 0.1%, was stable for 150 days. A mixture of polymethylene polyphenylisocyanate and a normal alkyl glycidyl ether having alkyl moieties of 12 to 14 carbon atoms, commercially available from Pacific Anchor Chemical under the trade name Epodil 748, also having a moisture content of about 0.1%, was stable for 30–45 days. Hence, to the extent longer shelf life is desired, epoxides with less than about 0.2% moisture are preferred for use herein. Especially desirable for even longer shelf life are epoxides with not more than about 0.1% moisture.

Second, monofunctional epoxides generally tend to have fewer residual hydroxyls than do difunctional or other multifunctional epoxides. As a result, monofunctional epoxides, or, alternatively, blends of primarily monofunctional epoxides with some difunctional or multifunctional epoxides yield better shelf life stability when mixed with an isocyanate than do primarily difunctional or multifunctional epoxides The following chart illustrates the impact on shelf life stability of a substantially liquid mixture of an isocyanate and epoxide, based upon epoxide functionality.

used, it is possible that they would be stable when mixed with isocyanate.

As used herein, the term "shelf life stable" means stable at room temperature for at least 30 days. If shelf

| Epoxide | Trade Name | Manufacturer | Functionality | Shelf life |
| --- | --- | --- | --- | --- |
| 2-Ethylhexyl Glycidyl Ether | Epodil 746 | Pacific Anchor Chemical | Monofunctional | 5 months |
| Alkyl ($C_{12}$-$C_{14}$) Glycidyl Ether | Epodil 748 | Pacific Anchor Chemical | Monofunctional | 2-3 months |
| Blend of 2-Ethylhexyl Glycidyl ether (>50%) and | MK 116 | Hi-Tek Polymers | Monofunctional | 2-3 months |
| 4,4'-Isopropylidinediphenol (Bisphenol A) | DER 331 | Dow Corning | Difunctional | |
| Blend of 2-Ethylhexyl Glycidyl Ehter (>50%) and Diglycidyl | MK 116 | Hi-Tek Polymers | Monofunctional | 2-3 months |
| Ether of 1,4-Butanediol | WC 67 | Hi-Tek Polymers | Difunctional | |
| Diglycidyl Ether of 1,4-Butanediol | WC 67 | Hi-Tek Polymers | Difunctional | 3 wks-2 mos. |
| Blend of Diglycidyl Ether of 1,4-Butanediol and | WC 67 | Hi-Tek Polymers | Difunctional | 2-3 weeks |
| 4,4'-Isopropylidinediphenol (Bisphenol A) | DER 383 | Dow Corning | Multifunctional | |
| Blend of Diglycidyl Ether of 1,4-Butanediol and | WC 67 | Hi-Tek Polymers | Difunctional | 2-3 weeks |
| N, N, N', N'-Tetraglycidyl-4,4'-Methylenebisbenzeneamine | MY 721 | Ciba Geigy | Multifunctional | |
| Blend of 4,4'-Isopropylidinediphenol (Bisphenol A) and | DER 331 | Dow Corning | Difunctional | 3-4 days |
| Diglycidyl Ether of Cyclohexane Dimethanol | MK 107 | Hi-Tek Polymers | Difunctional | |
| Blend of Poly(oxipropylene)Glycol and 4,4'-Isopropylidinediphenol | DER 736 | Dow Corning | Difunctional | 3 days |
| (Bisphenol A) | DER 331 | Dow Corning | Difunctional | |
| Blend of 4,4'-Isopropylidinediphenol (Bisphenol A) and | DER 331 | Dow Corning | Difunctional | 2 days |
| Triglycidyl Ether of Trimethylol Hexane | WC 98 | Hi-Tek Polymers | Difunctional | |

Although it may be possible to remove residual hydroxyls from difunctional and multifunctional epoxides by various techniques, thereby rendering them useful in the processes and compositions disclosed herein, epoxides that are commercially available at this time are not so treated, and it is not clear that such treatments would yield epoxides effective for use herein. However, if a dehydration process were employed to remove a certain amount of hydroxyls from a difunctional or a multifunctional epoxide, it is possible that such epoxides would be effective to impart shelf life stability to a mixture of an isocyanate and an epoxide, as described herein.

In addition, as the molecular weight of an epoxide utilized herein is increased, the residual hydroxyl content tends to increase and shelf life instability generally results. For example, a mixture of 2-ethylhexyl glycidyl ether having reported molecular weight 182, commercially available from Pacific Anchor Chemical under the trade name Epodil 746, and polymethylene polyphenylisocyanate, commercially available from BASF under the trade name Lupranate M-10, was stable for 150 days, whereas a mixture of normal alkyl glycidyl ether having alkyl moieties of 12 to 14 carbon atoms and having a reported molecular weight of approximately 241, commercially available from Pacific Anchor Chemical under the trade name Epodil 748, and the same polymethylene polyphenylisocyanate was stable for only 60-90 days. It may be possible to remove the hydroxyls on the higher molecular weight epoxides, but we have not found such epoxides to be currently commercially available at reasonable prices. If epoxides having more of their residual hydroxyls removed were life stability is not a necessary consideration for any given application, then a much wider variety of epoxides would obviously be useful in the process disclosed herein, as one skilled in the art would recognize from reading this disclosure.

The polyether polyol used in the second substantially liquid mixture may be any available polyether polyol having with hydroxyl number ranging from 25-600. Especially preferred is a polyether polyol commercially available from BASF under the trade name Polyol 380 or mixtures of polyether polyols commercially available from BASF under the trade names Polyol 380 and Polyol 975.

Preferably, the amount of polyether polyol used in the second substantially liquid mixture falls in the range of 85 to 96% by weight.

The catalyst used in the second substantially liquid mixture may be any of the known available catalysts that assist the formation of polyurethane foams including tertiary amines and their salts, such as triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine and dimethylbenzylamine.

Especially preferred is a particular organic salt of a tertiary amine, commercially available from Air Products under the trade name Dabco 8154.

The following catalysts have been found to be effective to prepare foams, but to date the foams created therefrom have not been found to be fully operative as contemplated herein: 33% trimethylenediamine and 67% dipropylene glycol, commercially available from Air Products under the trade name Dabco 33LV, 70% bis(dimethylamino ethyl)ether in 30% dipropylene glycol, commercially available from Air Products under the trade name Dabco BL-11, a tertiary amine catalyst, commercially available from Union Carbide under the trade name Niax C-174, 85% diethanolamine, 15% water, commercially available from Air Products under the trade name DEOA LF, and triethylenediamine, commercially available from Air Products under the trade name Dabco Crystalline.

Preferably, the amount of catalyst used in the second substantially liquid mixture falls in the range of 3.8 to 6% by weight of the mixture.

The accelerator used in the second substantially liquid mixture may be any of the commonly available accelerators, including, for example and without limitation, stannous octoate, lead octoate, sodium bicarbonate, dibutyltindimaleate, dibutyltinthiocarboxylates, dibutytinmercaptides and dibutyltindiacetate. Especially preferred is dibutyltin dilaurate, commercially available from Air Products under the trade name Dabco T-12.

Preferably, the amount of accelerator in part B falls in the range of 0.2 to 0.3% by weight of the mixture.

Optional additives, pigments, fillers and the like include, as representative examples and without limitation, hydrophobic fumed silica and polysiloxane, which may be added to either part A, part B or both to impart water repellancy to the foam, carbon black, which may be added to Part B as a pigment, and water, which may be added to part B to create a softer foam.

Varying the proportions of the components will impart different characteristics to the foam. The examples set forth herein illustrate the various characteristics that can be achieved by such variation. With only minimal experimentation, the proportions of the necessary and optional components may be varied as indicated on Table 1 to obtain the broad spectrum of products contemplated herein.

TABLE 1

| CHEMICAL | RANGE |
| --- | --- |
| Part A | |
| polymethylene polyphenylisocyanate | 90–20% |
| epoxide | 10–60% |
| hydrophobic fumed silica | 0–10% |
| polysiloxane | 0–10% |
| Part B | |
| polyether polyol | 96–85% |
| catalyst | 3.8–6% |
| accelerator | 0.2–0.3% |
| hydrophobic fumed silica | 0–6.2% |
| carbon black | 0–1% |
| water | 0–1.5% |

The apparatus for carrying out the process of this invention may be any device or set of devices that can simultaneously dispense and mix two liquids at the same location. An apparatus may be used that has two separate chambers for storage of the two mixtures before the reaction, a plunger to force such mixtures simultaneously from the two chambers, and a mixer such as a static mixer, adjacent to the two chambers and attached thereto that mixes the two mixtures. Especially preferred is a two part syringe dispenser with and attached static mixer, which mixes approximately equal volumes from two parts of a dispenser commercially available from Plas-Pak Industries of Niantic, Connecticut.

As is well known in the art, polyurethane foams are often described as being soft, hard or semi-hard. Those descriptions are used herein to convey the usual meaning attached to such words by those skilled in the art.

The following examples illustrate specific embodiments of the present invention. All parts and percentages are weight parts and weight percentages. Parts A and B are prepared by mixing the components at room temperature. Optimum results are obtained when part A is mixed in a dry nitrogen environment, or in an environment that is otherwise moisture-free.

EXAMPLE 1

The following components are mixed as Part A and then placed into one chamber of a two part syringe dispenser:

| Component | Parts by Weight |
| --- | --- |
| polymethylene polyphenylisocyanate commercially available under the trade name Lupranate M-10 from BASF | 83.0 |
| 2-ethylhexyl glycidyl ether commercially available under the trade name Epodil 746 from Pacific Anchor Chemical | 12.5 |
| hydrophobic fumed silica commercially available under the trade name Cab-O-Sil from Cabot | 4.5 |

The following components are mixed as Part B and then placed into a second chamber of a two part syringe dispenser, which is of approximately the same volume as Part A:

| Component | Parts by Weight |
| --- | --- |
| polyether polyol commercially available under the trade name Polyol 380 by BASF | 83.5 |
| polyether polyol commercially available under the trade name Polyol 975 by BASF | 7.5 |
| organic salt of tertiary amine commercially available under the trade name Dabco 8154 by Air Products | 6.7 |
| dibutyltin dilaurate commercially available under the trade name Dabco T-12 by Air Products | 0.3 |
| hydrophobic fumed silica same as above | 2.0 |

Upon dispensing the two parts through a static mixer attached to the two part syringe dispenser, a semi-hard, water resistant foam with a tough skin is formed.

EXAMPLE 2

The following components are mixed as Part A and then placed into one chamber of a two part syringe dispenser:

| Component | Parts by Weight |
| --- | --- |
| polymethylene polyphenylisocyanate same as above | 25.0 |
| 2-ethylhexyl glycidyl ether same as above | 56.0 |
| polysiloxane | 10.0 |

-continued

| Component | Parts by Weight |
| --- | --- |
| commercially available under the trade name Sylgard 182 from Cabot | |
| hydrophobic fumed silica same as above | 9.0 |

The following components are mixed as Part B and then placed into a second chamber of a two part syringe dispenser, which is if approximately the same volume as Part A:

| Component | Parts by Weight |
| --- | --- |
| polyether polyol commercially available under the trade name Polyol 380 from BASF | 87.0 |
| organic salt of tertiary amine same as above | 6.0 |
| dibutyltin dilaurate same as above | 0.3 |
| hydrophobic fumed silica same as above | 5.7 |
| carbon black commercially available under the trade name R-400 from Cabot | 1.0 |

Upon dispensing through a static mixer attached to the two part syringe dispenser, a soft foam with a tough skin and with 100% memory is formed.

EXAMPLE 3

The following components are mixed as Part A and then placed into one chamber of a two part syringe dispenser:

| Component | Parts by Weight |
| --- | --- |
| polymethylene polyphenylisocyanate same as above | 25.0 |
| 1-ethylhexyl glycidyl ether same as above | 56.0 |
| polysiloxane same as above | 10.0 |
| hydrophobic fumed silica same as above | 9.0 |

The following components are mixed as Part B and then placed into a second chamber of a two part syringe dispenser, which is of approximately the same volume as Part A:

| Component | Parts by Weight |
| --- | --- |
| polyether polyol commercially available under the trade name Polyol 380 from BASF | 87.0 |
| organic salt of tertiary amine same as above | 6.0 |
| dibutyltin dilaurate same as above | 0.3 |
| hydrophobic fumed silica same as above | 5.5 |
| carbon black same as above | 0.2 |
| water | 1.0 |

Upon dispensing through a static mixer attached to the two part syringe dispenser, a soft foam with a tough skin is formed.

EXAMPLE 4

The following components are mixed as Part A and then placed into one chamber of a two part syringe dispenser:

| Component | Parts by Weight |
| --- | --- |
| polymethylene polyphenylisocyanate same as above | 71.2 |
| 2-ethylhexyl glycidyl ether same as above | 22.8 |
| hydrophobic fumed silica same as above | 6.0 |

The following components are mixed as Part B and then placed into a second chamber of a two part syringe dispenser, which is of approximately the same volume as Part A:

| Component | Parts by Weight |
| --- | --- |
| polyether polyol commercially available under the trade name Polyol 975 from BASF | 92.92 |
| organic salt of tertiary amine same as above | 4.00 |
| dibutyltin dilaurate same as above | 0.28 |
| hydrophobic fumed silica same as above | 2.80 |

Upon dispensing through a static mixer attached to the two part syringe dispenser, a rigid, water-resistant foam with a tough skin is formed.

The foregoing description of preferred embodiments of the invention has been presented for purposes of illustration and description. It is not intended to be exhaustive or to limit the invention to the precise form disclosed, and as one skilled in the art would well recognize, many modifications and variations are possible in light of the above teaching that still fall within the spirit and scope of this invention. The embodiments disclosed herein were chosen and described to best explain the principles of the invention and its practical application to enable others skilled in the art to best utilize the invention in various embodiments and with various modifications as are suited to the particular use contemplated.

I claim:

1. A polyurethane foam produced by the process comprising:
    a. preparing a first substantially liquid mixture having shelf life stability comprising an isocyanate and an epoxide;
    b. preparing a second substantially liquid mixture comprising a polyether polyol, a catalyst and an accelerator;
    c. combining of the first and second substantially liquid mixtures.

2. The polyurethane foam of claim 1 wherein the isocyanate is polymethylene polyphenylisocyanate.

3. The polyurethane foam of claim 1 wherein the epoxide contains less than about 0.2% moisture.

4. The polyurethane foam of claim 3 wherein the epoxide is substantially monofunctional.

5. The polyurethane foam of claim 4 wherein the epoxide is selected from the class consisting of 1-ethylhexyl glycidyl ether and normal alkyl glycidyl ether having alkyl moieties of 12 to 14 carbon atoms and mixtures thereof.

6. The polyurethane foam of claim 5 wherein the catalyst is an organic salt of a tertiary amine.

7. The polyurethane foam of claim 6 wherein the accelerator is dibutyltin dilaurate.

8. The polyurethane foam of claim 1 wherein the isocyanate comprises 20–90% by weight of the first substantially liquid mixture and the epoxide comprises 10–60% by weight of the first substantially liquid mixture, the polyether polyol comprises 85–96% by weight of the second substantially liquid mixture, the catalyst comprises 3.8–6% by weight of the second substantially liquid mixture and the accelerator comprises 0.2–0.3% by weight of the second substantially liquid mixture.

9. A method for preparing a polyurethane foam comprising in combination, the following steps:
 a. preparing a first substantially liquid mixture having shelf life stability comprising an isocyanate and an epoxide;
 b. preparing a second substantially liquid mixture comprising a polyether polyol, a catalyst and an accelerator;
 c. combining the first and second substantially liquid mixtures.

10. A two component system useful to prepare polyurethane foams comprising:
 a. a first component comprising a mixture of an isocyanate and an epoxide having shelf life stability;
 b. a second component comprising a mixture of polyether polyol, a catalyst and an accelerator.

11. The two component system of claim 10 wherein the isocyanate is polymethylene polyphenylisocyanate.

12. The two component system of claim 10 wherein the epoxide has a moisture content of not less than about 0.2%.

13. The two component system of claim 12 where the epoxide is monofunctional.

14. The two component system of claim 13 wherein the epoxide is selected from the class consisting of 1-ethylhexyl glycidyl ether and normal alkyl glycidyl ether having alkyl moieties of 12 to 14 carbon atoms and mixtures thereof.

15. The two component system of claim 13 wherein the catalyst is an organic salt of a tertiary amine.

16. The two component system of claim 15 wherein the accelerator is dibutyltin dilaurate.

17. The two component system of claim 10 wherein, the isocyanate comprises 20–90% by weight of the first substantially liquid mixture and the epoxide comprises 10–60% by weight of the first substantially liquid mixture, the polyether polyol comprises 85–96% by weight of the second substantially liquid mixture, the catalyst comprises 3.8–6% by weight of the second substantially liquid mixture and the accelerator comprises 0.2–0.3% by weight of the second substantially liquid mixture.

* * * * *